(12) United States Patent
Katayama

(10) Patent No.: US 7,184,095 B2
(45) Date of Patent: Feb. 27, 2007

(54) DIGITAL BROADCAST/ANALOG BROADCAST RECEIVING APPARATUS

(75) Inventor: Takahiro Katayama, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 736 days.

(21) Appl. No.: 10/629,205

(22) Filed: Jul. 29, 2003

(65) Prior Publication Data

US 2004/0036806 A1   Feb. 26, 2004

(30) Foreign Application Priority Data

Aug. 22, 2002   (JP) .................... P2002-241563

(51) Int. Cl.
*H04N 7/00* (2006.01)
*H04N 5/445* (2006.01)

(52) U.S. Cl. .................... 348/468; 348/563

(58) Field of Classification Search ............. 348/465, 348/468, 553, 578, 584, 589, 594, 595, 598–600, 348/563, 565, 478, 564, 569; 725/137, 37, 725/38; *H04N 7/00, 5/445, 9/74*
See application file for complete search history.

(56) References Cited

U.S. PATENT DOCUMENTS 6,018,369 A * 1/2000 Patterson .................... 348/465
6,320,621 B1 * 11/2001 Fu ............................. 348/468

FOREIGN PATENT DOCUMENTS

JP   2002-44616   2/2002

OTHER PUBLICATIONS

Patent Abstracts of Japan No. 2002-044616, dated Feb. 8, 2002 (1 page).

* cited by examiner

*Primary Examiner*—Sherrie Hsia
(74) *Attorney, Agent, or Firm*—Osha Liang LLP

(57) ABSTRACT

A digital decoder decodes a digital broadcast signal inputted, and outputs a plurality of caption service data CSD1 to CSD6 to a CPU. The CPU 1 selects two among the CSD1 to CSD6, and converts the selected caption service data into closed caption data. The two closed caption data are allocated to each of closed captions CC1 and CC3, and are outputted from a digital broadcast/analog broadcast receiving apparatus to a display device.

8 Claims, 6 Drawing Sheets

DIGITAL BROADCAST/ANALOG BROADCAST RECEIVING APPARATUS

BACKGROUND OF THE INVENTION

1. Field of the Invention

The present invention relates to a digital broadcast/analog broadcast receiving apparatus and method for receiving a digital broadcast signal and an analog broadcast signal and outputting a video signal and an audio signal, and particularly to a digital broadcast/analog broadcast receiving apparatus and method for multiplexing a closed caption into a video signal and producing an output.

2. Description of the Related Art

A conventional digital broadcast/analog broadcast receiving apparatus includes a circuit for receiving a digital broadcast signal and a circuit for receiving an analog broadcast signal. When a channel selected is digital broadcast, the circuit for digital broadcast is used to convert the digital broadcast signal and a video signal, an audio signal and a closed caption of an analog mode are outputted. When the channel selected is analog broadcast, the circuit for analog broadcast signal is used to output a video signal, an audio signal and a closed caption of an analog mode.

In terrestrial analog television broadcasting of North America (NTSC system: National Television System Committee system), the closed caption is delivered by inserting closed caption information into the twenty-first scan line of the video signal in the side of a broadcast station. A receiving apparatus (a digital broadcast/analog broadcast receiving apparatus or an analog broadcast receiving apparatus having an analog broadcast receiving function) extracts and analyzes the closed caption information inserted into the video signal received and inserts the closed caption information back into the video signal and outputs the video signal to a display device. The display device displays program video and the closed caption on a screen based on the video signal. A method for delivering the closed caption by the twenty-first scan line (LINE. 21) of the video signal thus is defined by EIA-608.

In analog broadcast, a maximum of four languages can be used as a first to a fourth closed captions (CC1 to CC4). A first language (main language) is allocated to the first closed caption (closed caption 1 (CC1)) and a second language (sub language) is allocated to the third closed caption (closed caption 3 (CC3)).

On the other hand, in ground wave digital broadcasting of North America (ATSC system: Advanced Television Systems Committee system) similarly, a closed caption is delivered by data of "userdata" in an MPEG stream. Data including the closed caption delivered thus is called DTVCC and is defined by EIA-708B.

In the DTVCC, a maximum of six languages can be used as a first to a sixth caption service data (CSD1 to CSD6). A first language (main language) is allocated to thee first caption service data (caption service data 1 (CSD1)) and a second language (sub language) is allocated to the second caption service data (caption service data 2 (CSD2)).

However, in the conventional digital broadcast/analog broadcast receiving apparatus, as shown in FIG. 5, when a channel selected is digital broadcast, any of the caption service data 1 to 6 (CSD1 to CSD6) is selected and is outputted as a closed caption 1 (CC1) for analog broadcast. When all the caption service data are associated with one closed caption in this manner, a viewer must operate operation means (such as a remote control unit) of the digital broadcast/analog broadcast receiving apparatus at the time of changing the caption service data.

On the other hand, when the channel selected is analog broadcast, closed captions 1 to 4 (CC1 to CC4) inputted to the receiving apparatus are outputted as the closed captions 1 to 4 (CC1 to CC4) as they are as shown in FIG. 6. As a result, the viewer must operate operation means of the display device (such as a closed caption selection button) at the time of changing the closed caption.

As described above, when the viewer changes the closed caption, the operation means operated varies depending on whether the channel selected is digital broadcast or analog broadcast, and the operation becomes troublesome.

Various digital broadcast/analog broadcast receiving apparatus have been proposed conventionally, and there is a technique such disclosed in JP-A-2002-044616. However, no method for solving the problem described above is disclosed.

SUMMARY OF THE INVENTION

It is therefore an object of the invention is to provide a digital broadcast/analog broadcast receiving apparatus and method capable of easily selecting an arbitrary closed caption when a channel selected is any of digital broadcast and analog broadcast.

In order to achieve the above object, according to a first aspect of the invention, there is provided a digital broadcast/analog broadcast receiving apparatus including: a receiving section adapted to receive a digital broadcast signal and an analog broadcast signal; an analog encoding section adapted to convert the digital broadcast signal into a video signal of an analog mode, to multiplex a closed caption into the video signal and to output the video signal; and a control section adapted to extract a caption service data from the digital broadcast signal in accordance with a number of closed caption capable of output, to convert the each caption service data into the closed caption and to set the converted closed caption as the closed caption to be output.

According to the first aspect of the invention, a plurality of caption service data included in the digital broadcast signal are extracted and converted and closed captions included in the respective caption service data are arbitrarily allocated to a plurality of closed captions capable of output and thereby, the closed captions and the caption service data can be changed using operation section of a display device to which this digital broadcast/analog broadcast receiving apparatus outputs the video signal as long as setting is made once.

According to a second aspect of the invention, in addition to the first aspect of the invention, the control section includes: means for extracting only the caption service data in which the closed caption is delivered, from the digital broadcast signal; means for converting the extracted caption service data into the closed caption; and means for setting the converted closed caption as any of the closed caption to be output.

According to the second aspect of the invention, only the caption service data in which the closed caption is delivered is allocated to any of the closed captions outputted, so that the viewer can always see any of the closed captions without selecting the caption service data in which the closed caption is absent.

According to a third aspect of the invention, in addition to the first aspect of the invention, the control section includes: means for extracting a first caption service data and a second caption service data, from the digital broadcast signal;

means for converting the first caption service data and the second caption service data into a first closed caption and a second closed caption, respectively; means for setting the first converted closed caption as either a first closed caption or a second closed caption to be multiplexed into an odd field of the video signal; and means for setting the second converted closed caption as either a third closed caption or a fourth closed caption to be multiplexed into an even field of the video signal.

According to the third aspect of the invention, the first caption service data which is a main language delivered in digital broadcast is allocated to the closed caption of the odd field of a video signal of the analog mode and the second caption service data which is a sub language is allocated to the closed caption of the even field of the video signal of the analog mode. As a result, the two languages are allocated to the different fields respectively, so that the largest possible data (character information) is delivered to the respective fields as the closed captions of the analog mode.

According to a fourth aspect of the invention, in addition to the third aspect of the invention, the means for setting the first converted closed caption sets the first converted closed caption as the first closed caption to be multiplexed into the odd field of the video signal, and the means for setting the second converted closed caption sets the second converted closed caption as the third closed caption to be multiplexed into the even field of the video signal.

According to the fourth aspect of the invention, the first caption service data used as the main language in digital broadcast corresponds to the first closed caption used as the main language in analog broadcast and the second caption service data used as the sub language in digital broadcast corresponds to the third closed caption used as the sub language in analog broadcast, so that the viewer can easily recognize the main language and the sub language in the case of changing the closed caption and the caption service data.

BRIEF DESCRIPTION OF THE DRAWINGS

The above objects and advantages of the present invention will become more apparent by describing preferred exemplary embodiment thereof in detail with reference to the accompanying drawings, wherein.

DETAILED DESCRIPTION OF THE PREFERRED EMBODIMENTS

A digital broadcast/analog broadcast receiving apparatus according to a preferred embodiment of the invention will be described with reference to the drawings.

Figure 1:
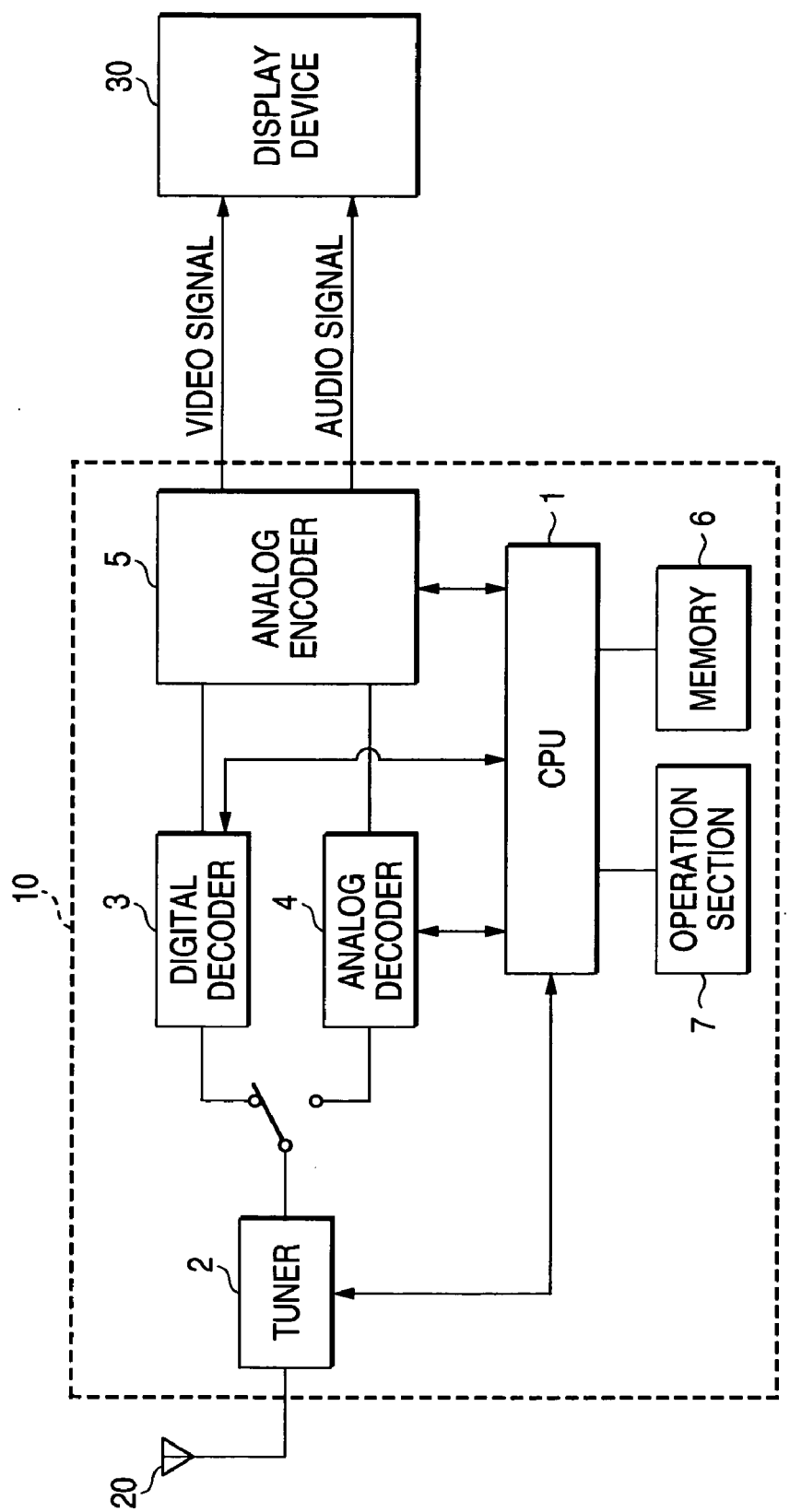
FIG. 1 is a block diagram showing a main part of a digital broadcast/analog broadcast receiving apparatus of an embodiment according to the invention.

FIG. 1 is a block diagram showing a main part of the digital broadcast/analog broadcast receiving apparatus.

In the digital broadcast/analog broadcast receiving apparatus 10, a tuner 2 (receiving section), a digital decoder 3, an analog decoder 4, an analog encoder 5 (analog encoding section), a CPU 1 (control section), memory 6 connected to the CPU 1 and operation section 7 by which a viewer inputs an operation such as setting and change of a closed caption are main components. Incidentally, the tuner 2 includes a digital broadcast signal receiving section and an analog broadcast signal receiving section, and can receive any of a digital broadcast signal and an analog broadcast signal.

When a viewer performs an operation for selecting a channel on which a desired program is broadcast using the operation section 7 such as a remote control unit in the case of receiving a program of digital broadcast, a selection signal is transmitted from the operation section 7 to the CPU 1 and the CPU 1 controls the tuner 2 so as to extract the corresponding channel. The tuner 2 extracts a digital broadcast signal (received by an antenna 20) of a channel on which a selected program is broadcast, and amplifies the signal and outputs the signal to the digital decoder 3. The digital decoder 3 separates the inputted digital broadcast signal into video data, audio data and caption service data, and outputs the video data and the audio data to the analog encoder 5. The analog encoder 5 converts the inputted video data and the audio data into a video signal and an audio signal of an analog mode. The caption service data is inputted to the CPU 1 and is converted into a closed caption and then is inputted to the analog encoder 5. Then, the analog encoder 5 multiplexes the closed caption into the video signal, and outputs the video signal and the audio signal to a display device 30.

On the other hand, in the case of receiving a program of analog broadcast, the tuner 2 extracts an analog broadcast signal (received by the antenna 20) of a channel on which the selected program is broadcast, and amplifies the signal and outputs the signal to the analog decoder 4. The analog decoder 4 separates the inputted analog broadcast signal into a video signal, an audio signal and a closed caption signal, and outputs the video signal and the audio signal to the analog encoder 5. The analog encoder 5 inserts a closed caption signal inputted through the CPU 1 into a video signal inputted, and outputs the video signal and the audio signal to the display device 30.

Hereinafter, a method for allocating the caption service data of the digital broadcast signal to the closed caption of the analog mode capable of output will be described with reference to the drawing.

First Method

Figure 2:
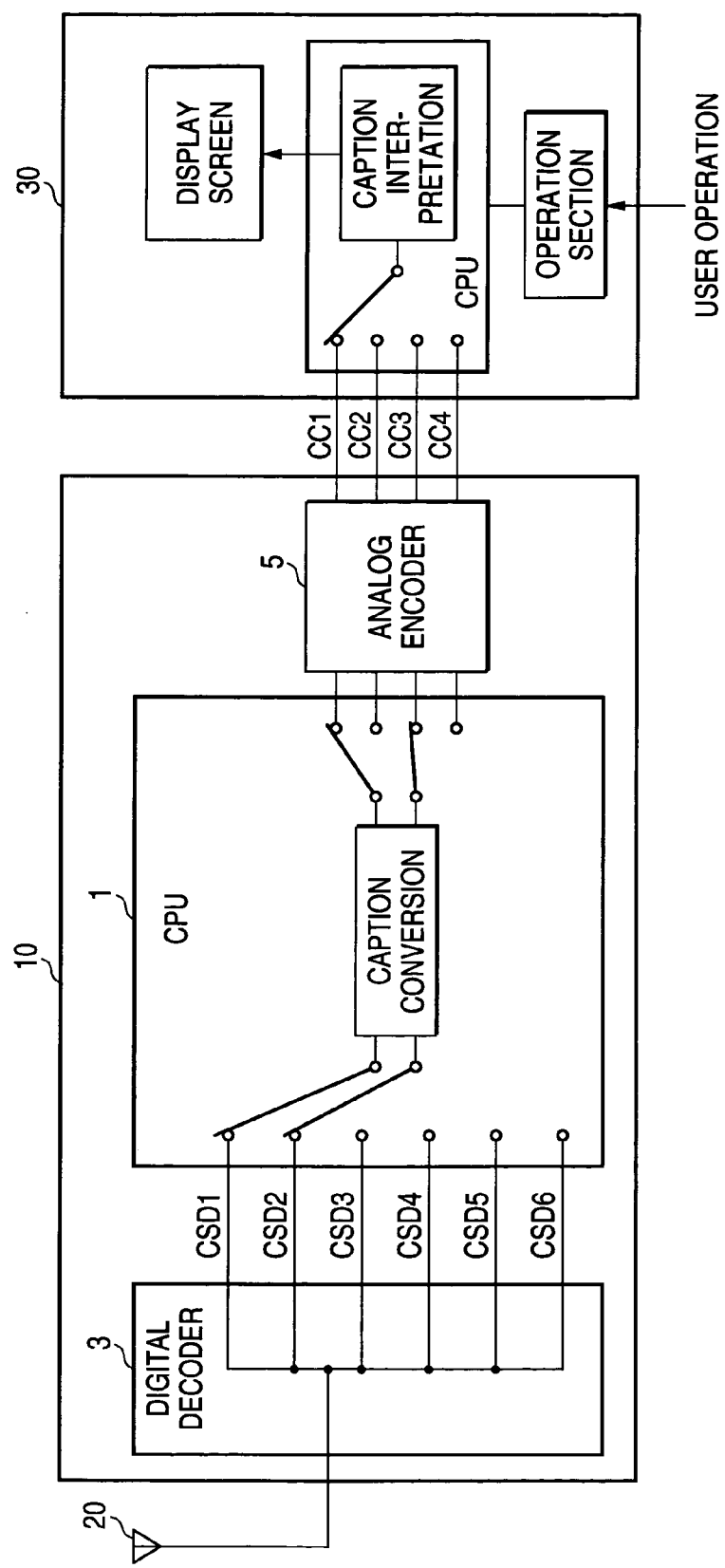
FIG. 2 is a block diagram showing a method for allocating caption service data of a case of receiving digital broadcast to a closed caption.

FIG. 2 is a block diagram showing a first method for allocating the caption service data (CSD) of the case of receiving digital broadcast to a closed caption (CC).

A digital broadcast signal inputted to the digital decoder 3 is separated into video data, audio data and a predetermined number (six in the embodiment) of caption service data (CSD).

The caption service data 1 to 6 (CSD1 to CSD 6) is inputted to the CPU 1 and two among the CSD1 to CSD 6 are selected. For example, the CSD1 and the CSD 2 are selected as shown in FIG. 2. The CPU 1 extracts closed captions from the CSD1 and the CSD 2 selected, and makes caption conversion, and generates closed caption data. The closed caption data generated is outputted to the display device 30 as a closed caption signal 1 (CC1) and a closed caption signal 3 (CC3) of the analog mode. The display device 30 displays the closed caption selected by the viewer among the closed captions CC1 and CC3 on a screen.

As a result, the viewer can substantially change the caption service data by operating the operation section of the display device 30 and changing the closed caption.

Also, the caption service data 1 (CSD1) used as a main language for digital broadcast is allocated to the closed caption 1 (CC1) used as a main language for analog broadcast and the caption service data 2 (CSD2) used as a sub language for digital broadcast is allocated to the closed caption 3 (CC3) used as a sub language for analog broadcast, thereby setting of languages such as the main language and the sub language can be matched in digital broadcast and analog broadcast. As a result, the viewer can set the languages such as the main language and the sub language without making a mistake regardless of whether broadcast of a channel selected is digital broadcast or analog broadcast.

Also, by inserting each the caption service data into only one of closed captions respectively constructing an odd field and an even field of the analog broadcast signal, the closed captions of the largest possible amount of transmission data (character information) in each the field can be outputted. As a result, even in the case of generating the closed captions based on the caption service data with a large amount of information for digital broadcast, the largest possible amount of information can be reflected from the caption service data to the closed captions.

Second Method

Figure 3:
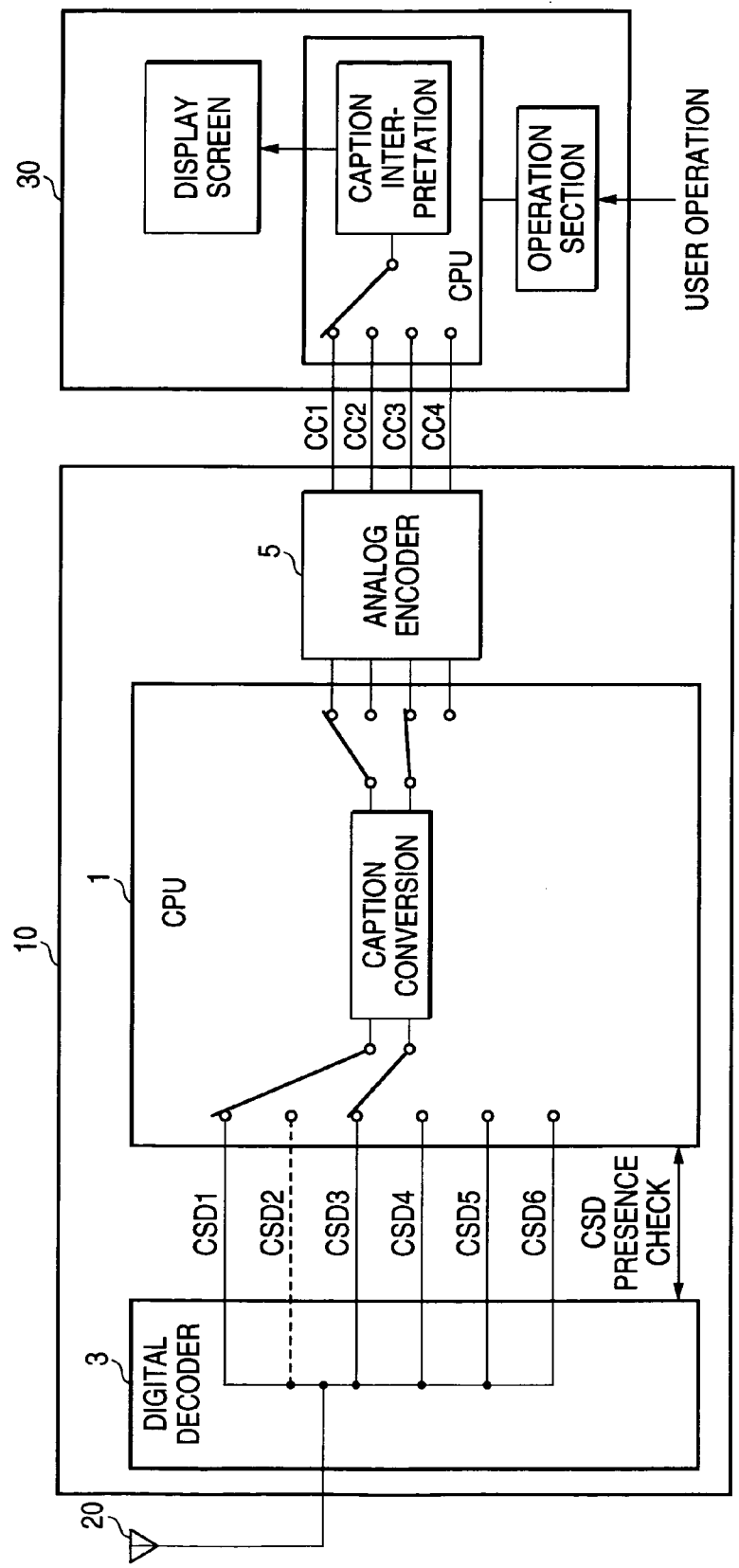
FIG. 3 is a block diagram showing a method for automatically allocating caption service data of the case of receiving digital broadcast to the closed caption.

FIG. 3 is a block diagram showing a second method for automatically allocating caption service data of the case of receiving digital broadcast to the closed caption.

The digital broadcast signal inputted to the digital decoder 3 is separated into video data, audio data and six caption service data (CSD1 to CSD6).

The CSD1 to CSD6 separated from the video data and the audio data are inputted to the CPU 1, and the CPU 1 checks whether or not closed captions are actually delivered in the CSD1 to CSD6 inputted, and extracts only the caption service data delivered. For example, as shown in FIG. 3, when only CSD1 and CSD3 actually deliver information and CSD2 does not deliver information, the CPU 1 extracts the CSD1 and the CSD3, and makes caption conversion of closed captions included respectively, and generates closed caption data. The closed caption data is inputted to an analog encoder and is inserted into LINE 21 of a video signal by the analog encoder and is outputted to the display device 30. The closed caption data is outputted as the closed caption signal 1 (CC1) and the closed caption signal 3 (CC3) of the analog mode.

The display device 30 displays a closed caption selected by a viewer among these closed captions CC1 and CC3 on a screen.

The viewer can substantially change the caption service data by operating the operation section of the display device 30 and changing the closed caption. Also, only the caption service data for delivering information is extracted by the CPU 1, so that the viewer can always see the closed caption of any of the languages when any of the closed captions is selected.

Figure 4:
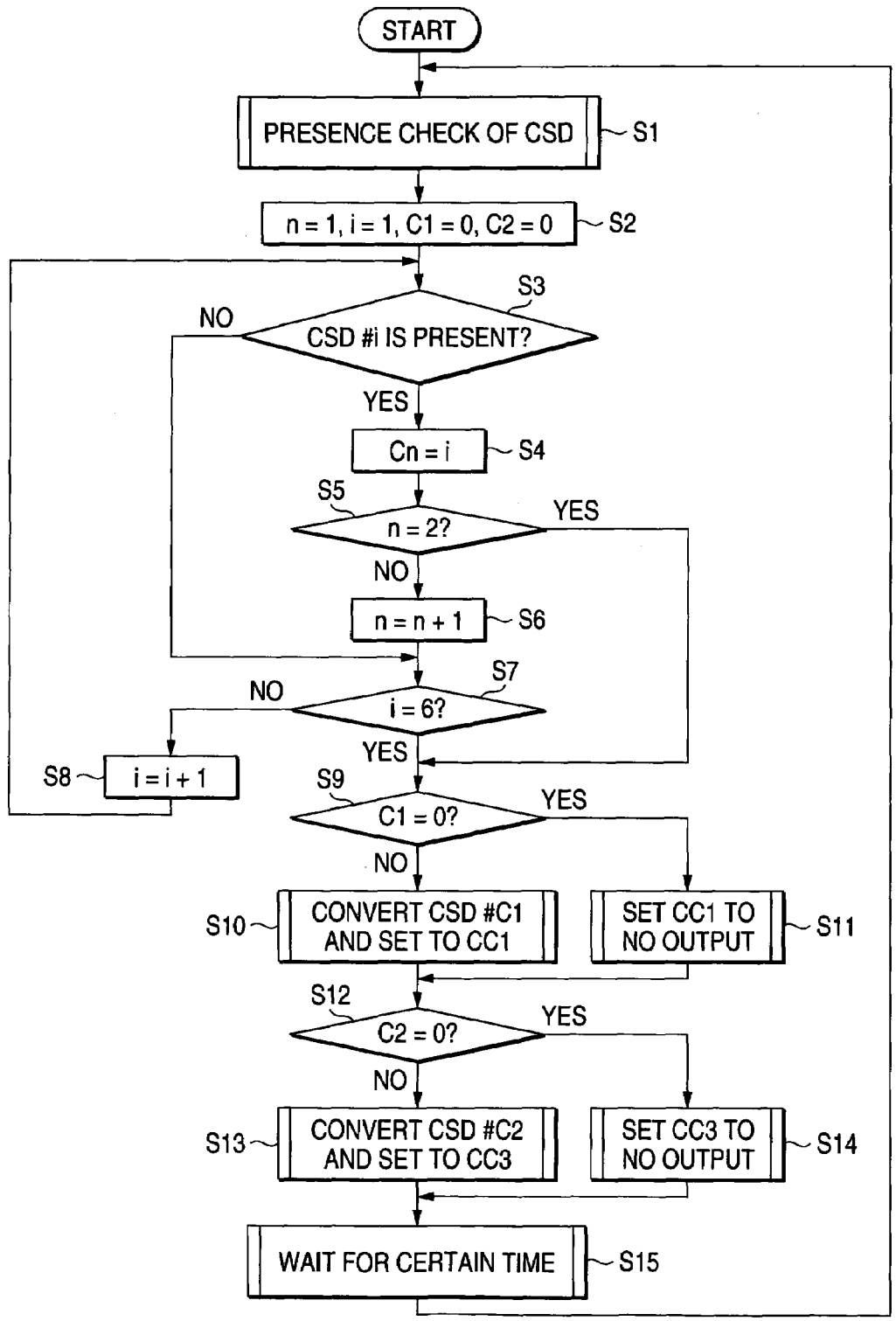
FIG. 4 is a flowchart showing a method for extracting caption service in which information is delivered actually and allocating the caption service to the closed caption.
Figure 5:
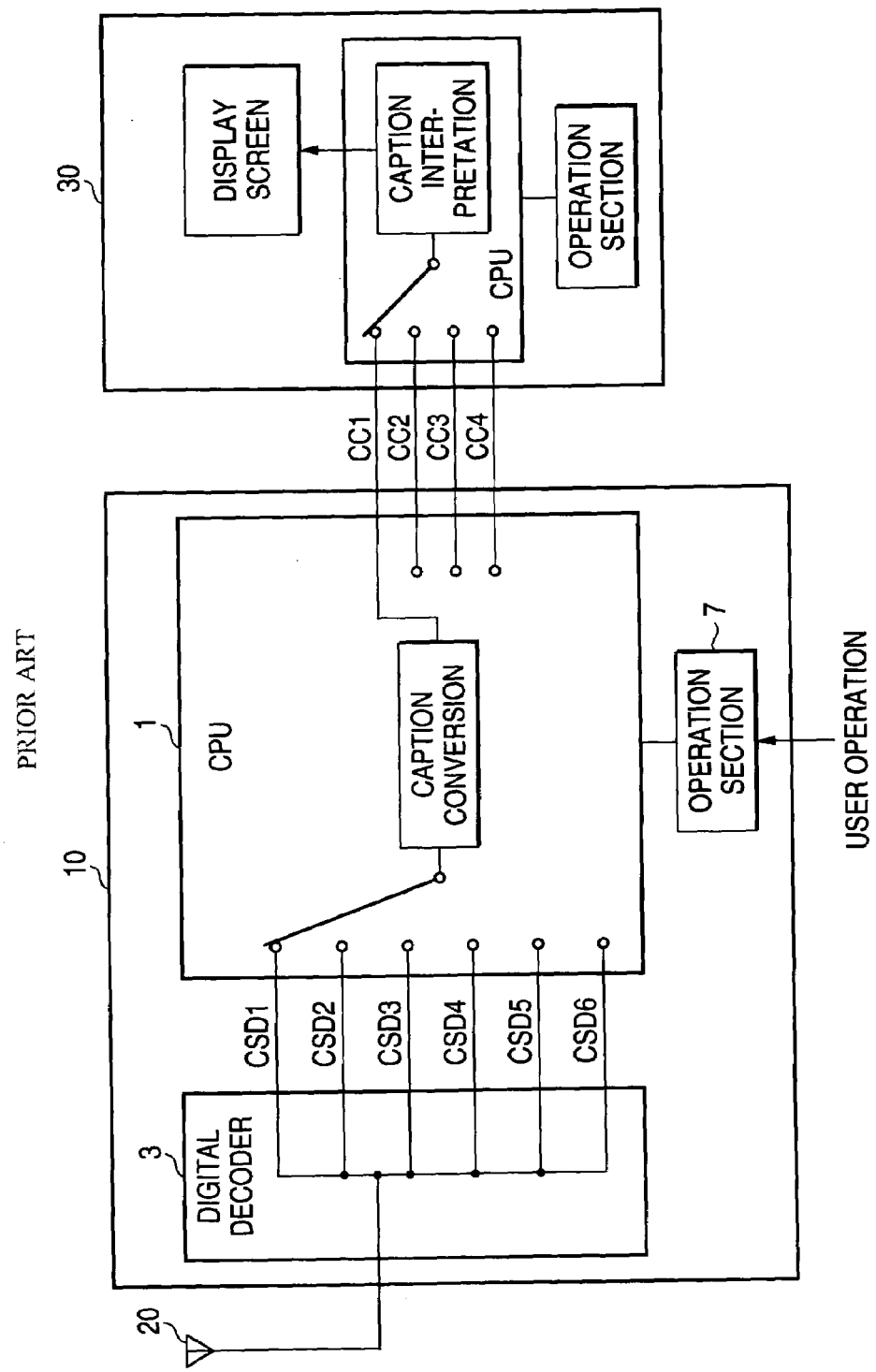
FIG. 5 is a block diagram showing a method for allocating caption service data of the case of receiving digital broadcast to the closed caption in a conventional digital broadcast/analog broadcast receiving apparatus.
Figure 6:
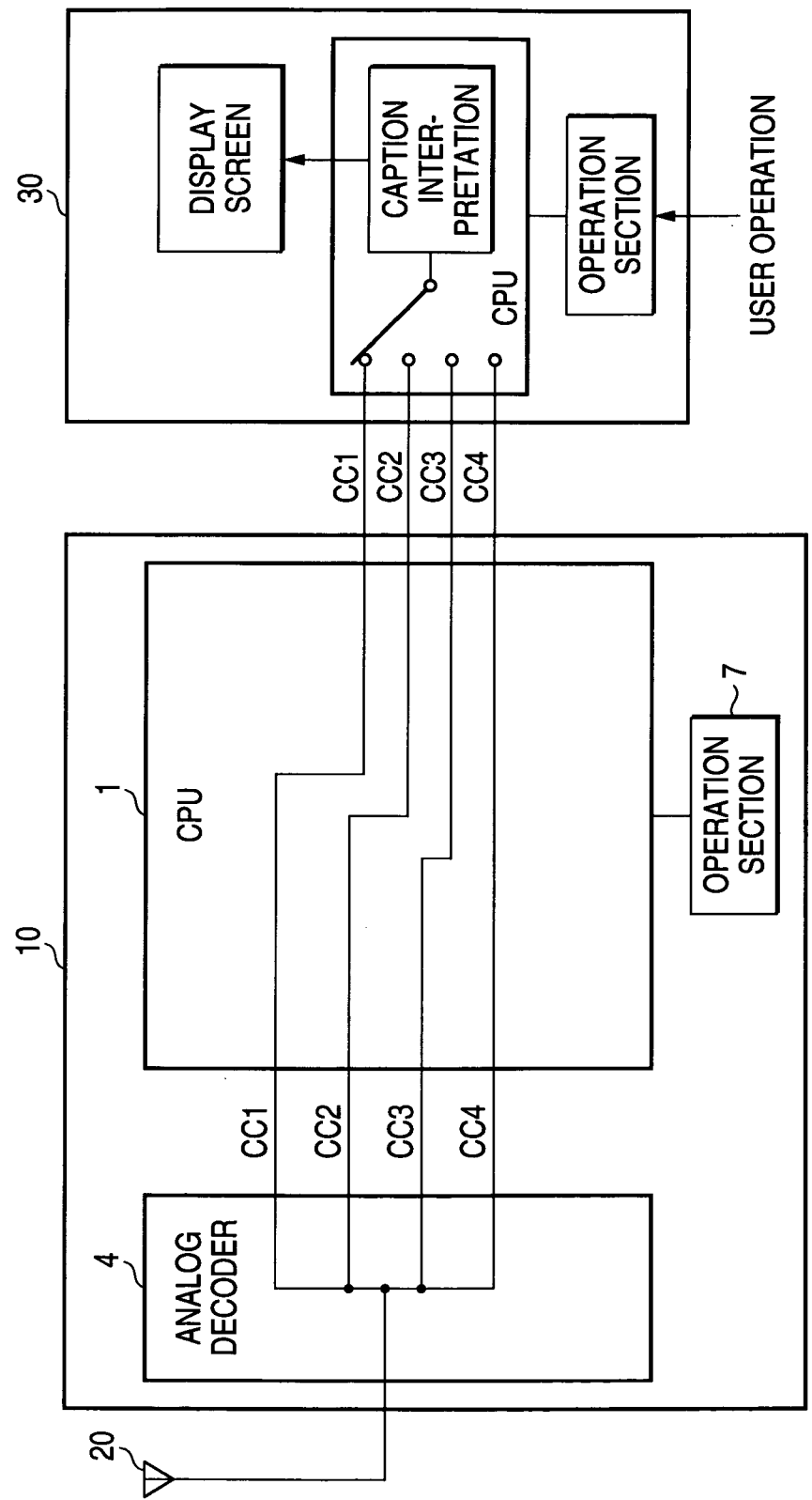
FIG. 6 is a block diagram showing a method for allocating a closed caption of the case of receiving analog broadcast in the conventional digital broadcast/analog broadcast receiving apparatus.

A series of the above-described action will be described with reference to a flowchart shown in FIG. 4.

When the viewer selects a channel, it is checked which caption service (CSD) is present in a program selected (step S1). In the check method, initial values are set to a caption service data number i=1, a temporary closed caption number n=1, an argument C1=0 showing a temporary first closed caption, and an argument C2=0 showing a temporary second closed caption (step S2). First, it is checked whether or not caption service data 1 (CSD1) is present and if so, it is updated to the argument C1=1 (steps from S3 to S4). Thereafter, the temporary closed caption number and the caption service data number are updated and it is checked whether or not the next caption service data 2 (CSD2) is present (steps from S5 to S3 via S6, S7 and S8). Next, when the caption service data 2 (CSD2) is not present (each information such as the closed caption is not delivered actually), an argument "i" is incremented by one and a presence check of the next caption service data 3 (CSD3) is made (steps from S3 to S3 via S7 and S8). Then, since the caption service data 3 (CSD3) is present, it is updated to the argument C2=3 (steps from S3 to S4). When the arguments C1 and C2 are confirmed (step S5), the argument C1 is allocated to a closed caption 1 (CC1) and the caption service data 1 (CSD1) is set to the closed caption 1 (CC1) (steps from S9 to S10). Then, the argument C2 is allocated to a closed caption 3 (CC3) and the caption service data 3 (CSD3) is set to the closed caption 3 (CC3) (steps from S12 to S13).

Here, for example, as another example, when only caption service data 1 (CSD1) is present, the caption service data 1 is set to a closed caption 1 (CC1) (steps from S9 to S10) and no data is set to a closed caption 3 (CC3) (steps from S12 to S14). Also, when no caption service is present, no data is set to a closed caption 1 (CC1) and a closed caption 3 (CC3) (steps from S9 to S14 via S11 and S12).

The above actions wait for a certain time while a program currently selected ends (step S15) and when the program is changed, the same action as described above is again repeated. Also, this action is continued until a channel is changed or an apparatus power source is turned off.

Incidentally, in the first method described above, the caption service data 1 (CSD1) is allocated to the closed caption 1 (CC1) and the caption service data 2 (CSD2) is allocated to the closed caption 3 (CC3), but the viewer can arbitrarily set which caption service data (CSD1 to CSD6) is allocated to any of the closed captions (CC1 to CC4).

Also, in the second method described above, processing is ended when two caption service data in which the closed captions are delivered actually are found in increasing order of the caption service number. However, the number of caption service data for performing extraction and allocation may be changed in response to the number of closed captions used.

Also, in response to the needs of viewers, each the caption service data delivered actually may arbitrarily be allocated to each the closed caption after extracting the caption service data delivered actually.

According to the digital broadcast/analog broadcast receiving apparatus of the embodiment, a plurality of caption service data included in the digital broadcast signal are extracted and converted and the closed captions included in the respective caption service data are arbitrarily allocated in response to the number of closed captions capable of output. Therefore, the caption service data can be changed using operation section of the display device to which the digital broadcast/analog broadcast receiving apparatus outputs the video signal into which the closed captions are multiplexed as long as setting is made once. As a result, the viewer can easily change the closed caption regardless of whether the channel selected is digital broadcast or analog broadcast.

According to the digital broadcast/analog broadcast receiving apparatus of the embodiment, only caption service data in which the closed caption is delivered is allocated to any of the closed captions capable of being outputted, so that the viewer can always see any of the closed captions without selecting the caption service data in which the closed caption is absent.

According to the digital broadcast/analog broadcast receiving apparatus of the embodiment, the first caption service data which is the main language delivered in digital broadcast is allocated to the closed caption of the odd field of the video signal of the analog mode and the second caption service data which is the sub language is allocated to the closed caption of the even field of the video signal of the analog mode. Therefore, the two languages are allocated to the different fields respectively, so that the largest possible data (character information) can be delivered to the respective fields as the closed captions of the analog mode.

According to the digital broadcast/analog broadcast receiving apparatus of the invention, the first caption service data used as the main language in digital broadcast corresponds to the first closed caption used as the main language in analog broadcast and the second caption service data used as the sub language in digital broadcast corresponds to the third closed caption used as the sub language in analog broadcast, so that the viewer can easily recognize the main language and the sub language in the case of changing the caption service data.

Although the present invention has been shown and described with reference to specific preferred embodiments, various changes and modifications will be apparent to those skilled in the art from the teachings herein. Such changes and modifications as are obvious are deemed to come within the spirit, scope and contemplation of the invention as defined in the appended claims.

What is claimed is:

1. A digital broadcast/analog broadcast receiving apparatus comprising:
   a receiving section adapted to receive a digital broadcast signal and an analog broadcast signal;
   an analog encoding section adapted to convert the digital broadcast signal into a video signal of an analog mode, to multiplex a closed caption into the video signal and to output the video signal; and
   a control section adapted to extract a caption service data from the digital broadcast signal in accordance with a number of closed caption capable of output, to convert the each caption service data into the closed caption and to set the converted closed caption as the closed caption to be output,
   wherein the control section includes:
   means for extracting only the caption service data in which the closed caption is delivered, from the digital broadcast signal;
   means for converting the extracted caption service data into the closed caption; and
   means for setting the converted closed caption as any of the closed caption to be output.

2. A digital broadcast/analog broadcast receiving apparatus comprising:
   a receiving section adapted to receive a digital broadcast signal and an analog broadcast signal;
   an analog encoding section adapted to convert the digital broadcast signal into a video signal of an analog mode, to multiplex a closed caption into the video signal and to output the video signal; and
   a control section adapted to extract a caption service data from the digital broadcast signal in accordance with a number of closed caption capable of output, to convert the each caption service data into the closed caption and to set the converted closed caption as the closed caption to be output,
   wherein the control section includes:
   means for extracting a first caption service data and a second caption service data, from the digital broadcast signal;
   means for converting the first caption service data and the second caption service data into a first closed caption and a second closed caption, respectively;
   means for setting the first converted closed caption as either a first closed caption or a second closed caption to be multiplexed into an odd field of the video signal; and
   means for setting the second converted closed caption as either a third closed caption or a fourth closed caption to be multiplexed into an even field of the video signal.

3. A digital broadcast/analog broadcast receiving apparatus comprising:
   a receiving section adapted to receive a digital broadcast signal and an analog broadcast signal;
   an analog encoding section adapted to convert the digital broadcast signal into a video signal of an analog mode, to multiplex a closed caption into the video signal and to output the video signal; and
   a control section adapted to extract a caption service data from the digital broadcast signal in accordance with a number of closed caption capable of output, to convert the each caption service data into the closed caption and to set the converted closed caption as the closed caption to be output.

4. The apparatus as claimed in claim 3, wherein the control section includes:
   means for extracting only the caption service data in which the closed caption is delivered, from the digital broadcast signal;
   means for converting the extracted caption service data into the closed caption; and
   means for setting the converted closed caption as any of the closed caption to be output.

5. The apparatus as claimed in claim 3, wherein the control section includes:
   means for extracting a first caption service data and a second caption service data, from the digital broadcast signal;
   means for converting the first caption service data and the second caption service data into a first closed caption and a second closed caption, respectively;
   means for setting the first converted closed caption as either a first closed caption or a second closed caption to be multiplexed into an odd field of the video signal; and
   means for setting the second converted closed caption as either a third closed caption or a fourth closed caption to be multiplexed into an even field of the video signal.

6. The apparatus as claimed in claim 5, wherein the means for setting the first converted closed caption sets the first converted closed caption as the first closed caption to be multiplexed into the odd field of the video signal, and wherein the means for setting the second converted closed caption sets the second converted closed caption as the third closed caption to be multiplexed into the even field of the video signal.

7. A digital broadcast/analog broadcast receiving method comprising:
   receiving a digital broadcast signal and an analog broadcast signal;
   extracting only caption service data in which closed caption is delivered, from the digital broadcast signal;
   converting the extracted caption service data into the closed caption;
   setting the converted closed caption as any of the closed caption to be output; and
   outputting a video signal by converting the digital broadcast signal into the video signal of an analog mode and by multiplexing the closed caption into the video signal.

8. A digital broadcast/analog broadcast receiving method comprising:
   receiving a digital broadcast signal and an analog broadcast signal;
   extracting a first caption service data and a second caption service data, from the digital broadcast signal;
   converting the first caption service data and the second caption service data into a first closed caption and a second closed caption, respectively;
   setting the first converted closed caption as either a first closed caption or a second closed caption to be multiplexed into an odd field of the video signal;
   setting the second converted closed caption as either a third closed caption or a fourth closed caption to be multiplexed into an even field of the video signal; and
   outputting a video signal by converting the digital broadcast signal into the video signal of an analog mode and by multiplexing the closed caption into the video signal.

* * * * *